United States Patent Office 2,748,121
Patented May 29, 1956

2,748,121
6-NITROARYL DERIVATIVES OF 2-AMINO-4-PYRIMIDOLS

Kurt J. Rorig, Evanston, Ill., assignor, by mesne assignments, to G. D. Searle & Co., Skokie, Ill., a corporation of Delaware No Drawing. Application June 17, 1954,
Serial No. 437,562

3 Claims. (Cl. 260—256.4)

My present invention relates to a new group of 2-amino-4-pyrimidols substituted in the 6-position by nitroaryl or aminoaryl radicals, their derivatives and salts thereof. More specifically, my invention relates to the compounds of the structural formula

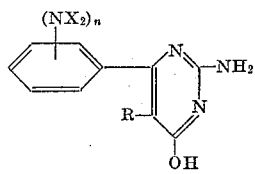

wherein R is either a hydrogen or a lower aliphatic hydrocarbon radical, X is either a hydrogen or an oxygen atom, and $n$ is either 1 or 2.

In the foregoing structural formula the radical R can represent a hydrogen radical or a lower aliphatic radical such as a methyl, ethyl, straight-chain and branched propyl, butyl, amyl, and hexyl or a lower alkenyl radical such as allyl, methallyl, crotyl, pentenyl, hexenyl, and the like.

The compounds of my invention provide valuable medicinal and, more specifically, diuretic and cardio-regulatory agents. In addition, they are also useful as intermediates in the synthesis of other pharmaceutically valuable drugs. For example by quaternization of the amino groups, active antibacterial agents are obtained.

A number of routes are available for the synthesis of the claimed compositions. Thus a simple acid addition salt of guanidine can be condensed with a lower alkyl ester of an α-(nitrobenzoyl)alkanoic or α-(dinitrobenzoyl)alkanoic acid in a solvent such as a lower alkanol to yield the claimed 6-nitrophenyl-4-pyrimidols and 6-dinitrophenyl-4-pyrimidols. These can be hydrogenated in the presence of a noble metal catalyst such as platinic oxide to yield the corresponding aminophenyl or diaminophenyl compounds. An alternative route, which is particularly suitable for the synthesis of 6-(4'-nitrophenyl) and (2',4'-dinitrophenyl) derivatives, utilizes the direct nitration of the corresponding 6-phenyl-4-pyrimidol with nitric acid in the presence of sulfuric acid.

The compounds of my invention form salts with a variety of inorganic and strong organic acids, including sulfuric, phosphoric, hydrochloric, hydrobromic, sulfamic, citric, ascorbic, and related acids. They also form quaternary ammonium salts with a variety of organic esters of sulfuric, hydrohalic and aromatic sulfonic acids which provide anions which are non-toxic in therapeutic dosage. Among such esters are methyl chloride and bromide; ethyl chloride, propyl chloride, butyl chloride, isobutyl chloride, benzyl bromide, phenethyl bromide, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The following examples will illustrate in further detail the compounds which constitute my invention and methods for their preparation. However, my invention is not to be construed as limited thereby in spirit or in scope. In these examples quantities of materials are indicated in parts by weight.

Example 1

In a reaction vessel equipped with a reflux condenser and a drying tube, a solution of 170 parts of guanidine carbonate, 325 parts of the ethyl ester of α-benzoylpropionic acid and 1000 parts of ethanol is heated at reflux temperature for 12 hours. The reaction mixture is then stored at 0° C. for 24 hours. A precipitate forms which is collected on a filter and the mother liquor is evaporated under vacuum to about one-third of its original volume and then diluted with 1500 parts of hot water. Upon cooling, an additional yield of the 2-amino-5-methyl-6-phenyl-4-pyrimidol is obtained.

A solution of 24 parts of this compound in 365 parts of concentrated sulfuric acid is stirred and maintained at —10° C. while 13 parts of potassium nitrate are added in the course of an hour. Stirring is continued for another hour, after which the reaction mixture is poured onto 200 parts of crushed ice. The mixture is rendered alkaline by addition of sodium bicarbonate and the yellow precipitate is collected on a filter, washed with water, and recrystallized from a mixture of ethoxyethanol and water. The light yellow microcrystalline powder thus obtained melts at about 297–298° C. with decomposition. The 2-amino-5-methyl-6-(4'-nitrophenyl)-4-pyrimidol thus obtained has the structural formula

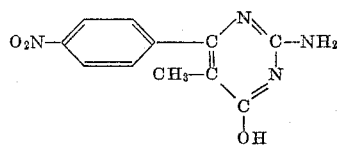

Example 2

A mixture of 24.6 parts of 2-amino-5-methyl-6-(4'-nitrophenyl)-4-pyrimidol, 800 parts of ethanol, 500 parts of water, 600 parts of 0.5-N hydrochloric acid and 5 parts of platinum dioxide is reduced in a shaking hydrogenator at 40 lbs. hydrogen pressure for 25 minutes. The initially yellow solution becomes colorless. The catalyst is removed by filtration and the filtrate is concentrated to one-third of its original volume and neutralized with aqueous sodium bicarbonate. The light yellow precipitate is collected on a filter, washed with water, and dried. Recrystallized from ethanol, the 2-amino-5-methyl-6-(4'-aminophenyl)-4-pyrimidol thus obtained melts at about 275–276° C. with decomposition.

Treatment of an ethanol solution of this base with two equivalents of anhydrous hydrogen chloride and dilution of the reaction mixture with ether causes precipitation of the dihydrochloride which melts at about 302–305° C. with decomposition. This salt has the structural formula

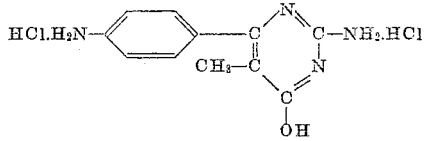

Example 3

Under anhydrous conditions a mixture of 38 parts of guanidine carbonate and 113 parts of the ethyl ester of 3,5-dinitrobenzoylacetic acid and 1000 parts of absolute ethanol is stirred and refluxed for 10 hours. After chilling, the initial crop of crystals is collected on a filter. The mother liquor is concentrated, diluted with hot water and cooled. The resulting 2-amino-6-(3',5'-dinitrophenyl)-4-pyrimidol is thus obtained in yellow, high-melting crystals.

Example 4

A mixture of 278 parts of 2-amino-6-(3',5'-dinitrophenyl)-4-pyrimidol, 8000 parts of ethanol, 5000 parts of water, 6000 parts of 0.5-N hydrochloric acid and 50 parts of platinum dioxide is hydrogenated for 40 minutes at 50 lbs. pressure with shaking. Then the contents of the bomb are filtered, and the filtrate is concentrated to one-third of its original volume. The residue is neutralized by addition of aqueous sodium bicarbonate solution. The resulting precipitate is collected on a filter, washed with water, dried and recrystallized from ethanol using charcoal decolorization. Treatment of an ethanolic solution of the 2-amino-6-(3',5'-diaminophenyl)-4-pyrimidol with anhydrous hydrogen chloride yields a high-melting trihydrochloride of the structural formula

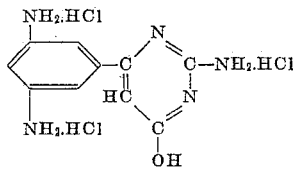

Example 5

Reaction of 38 parts of guanidine carbonate and 99.3 parts of the ethyl ester of α-benzoylhexanoic acid by the method of Example 1 yields 2-amino-5-n-butyl-6-phenyl-4-pyrimidol which melts at about 300–302° C. with decomposition. A solution of 58 parts of this product in 720 parts of concentrated sulfuric acid is treated in the course of an hour at —10° C. with stirring with 26 parts of potassium nitrate. The reaction mixture is then poured onto 400 parts of crushed ice and made alkaline by addition of sodium bicarbonate. The orange precipitate is collected on a filter and washed with water. On recrystallization from a mixture of 2-ethoxy-ethanol and water, a fine yellow high-melting powder is obtained consisting of 2-amino-5-n-butyl-6-(4'-nitrophenyl)-4-pyrimidol.

Example 6

A solution of 10 parts of 2-amino-5-n-butyl-6-(4'-nitrophenyl)-4-pyrimidol, 400 parts of ethanol, 280 parts of water, 110 parts of 1-N hydrochloric acid solution and 2 parts of platinum dioxide is hydrogenated with shaking for 30 minutes at 35 lbs. pressure during which time the initially yellow mixture becomes practically colorless. The contents of the bomb are filtered. The filtrate is concentrated to about one-fourth of its original volume and neutralized with aqueous sodium bicarbonate. On standing, a precipitate forms which is collected on the filter, washed with water, dried and recrystallized from 2-propanol. 2-amino-5-n-butyl-6-(4'-aminophenyl)-4-pyrimidol is thus obtained in long, high-melting prisms. The compound has the structural formula

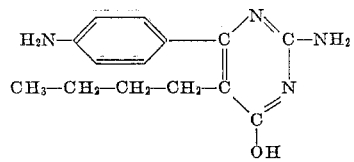

I claim:
1. A compound of the structural formula

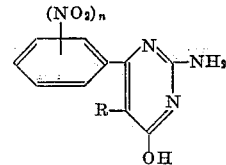

wherein R is a lower alkyl radical and n is a positive integer less than three.

2. A 2-amino-5-(lower alkyl)-6-nitrophenyl-4-pyrimidol.

3. 2-amino-5-methyl-6-nitrophenyl-4-pyrimidol.

References Cited in the file of this patent
UNITED STATES PATENTS
2,624,731    Hitchings et al. _____ Jan. 6, 1953

OTHER REFERENCES
Handbook of Chem. and Physics (31st ed., 1949), p. 601; Chem. Rubber Pub. Co.